United States Patent [19]
Lemke

[11] Patent Number: 5,859,506
[45] Date of Patent: Jan. 12, 1999

[54] HIGH-EFFICIENCY INCANDESCENT LAMP POWER CONTROLLER

[76] Inventor: Guido Lemke, 207 E. Hook Rd., Hopewell Jct, N.Y. 12533

[21] Appl. No.: 550,755

[22] Filed: Feb. 26, 1996

[51] Int. Cl.[6] ................................................. H05B 37/02

[52] U.S. Cl. ......................... 315/308; 315/224; 323/282

[58] Field of Search ............................... 315/209 R, 224, 315/307, 308, 291; 323/282

[56] References Cited

U.S. PATENT DOCUMENTS

| | | | |
|---|---|---|---|
| 4,230,970 | 10/1980 | Pitter et al. ............................... | 315/307 |
| 4,902,958 | 2/1990 | Cook, II .................................. | 323/282 |

*Primary Examiner*—Robert J. Pascal
*Assistant Examiner*—Michael Shingleton

[57] ABSTRACT

A high-efficiency low-cost electronic controller circuit for powering incandescent lamps which provides constant RMS voltage output from a battery or other varying output DC supply. The controller prolongs lamp life by limiting the cold filament in-rush power thereby reducing filament thermal shock deterioration. The controller further prolongs lamp life by supplying rectified AC power which reduces lamp filament embrittlement. A supply voltage monitor indicates a low-battery condition by flashing the lamp. A battery tester enables determination of the battery voltage which is indicated by pulse-coded modulation of the incandescent lamp brightness. A transistor contained in the controller eliminates the usual high-current mechanical power switch.

29 Claims, 9 Drawing Sheets

HIGH-EFFICIENCY INCANDESCENT LAMP POWER CONTROLLER

BACKGROUND OF INVENTION

1. Field of Invention

This invention relates to more efficient production of light from battery-powered flashlights by the addition of a voltage regulator circuit which supplies the incandescent lamp with relatively constant RMS voltage independent of battery voltage output. During start-up the regulator circuit in the present invention provides gradual power application to the incandescent lamp life reducing cold-filament thermal shock and thereby extending lamp life. Lamp life is further extended by the use of rectified AC power which reduces filament embrittlement. A voltage monitor circuit signals the approach of battery end-of-life by modulating the light output of the flashlight. A battery tester enables determination of the battery voltage which is indicated to the user by the flashing pattern of the light. An inherent power-off characteristic of the present invention eliminates the need for the commonly used high power on-off switch.

While this invention is intended primarily for the improvement of flashlight performance, it can also be used to advantage in other illumination products or other product applications where accurate delivery of root mean square, RMS, power to a resistive load is required.

2. Flashlights

Currently commercialized flashlights employ a direct mechanically switched connection between the battery power source and the incandescent lamp. This simple design approach provides a very low initial-cost solution which suffers from several shortcomings. All batteries of the type traditionally used in current flashlights exhibit relatively poor voltage maintenance characteristics over their useful life which results in substantial variability of light output and less that optimum energy conversion efficiency. Additionally, the current flashlight design approach is also subject to premature lamp and switch failures caused by very high cold-filament in-rush currents which exceed steady-state current levels by as much as a factor of ten.

Incandescent lamps produce visible light by resistive heating of the lamp filament to elevated temperatures in the range of 2200° K to 3350° K.[1] Most of the electrical power applied to the incandescent lamps is lost to thermal convection and emission in the infra-red spectrum with only a small fraction of the applied power producing the useful visible light. As the power applied to the lamp is increased, the filament temperature increases somewhat less than proportionately while the useful visible light increases very rapidly as described by the Stefan-Bolzman law[2] of thermal radiation which states that "the power emitted from a black body thermal source is proportional to the fourth power of its absolute temperature."

Increasing the power applied to an incandescent lamp increases the filament temperature which accelerates the filament material evaporation rate. As the filament material evaporates with lamp usage, the filament strength deteriorates which ultimately leads to filament failure.[3] Additionally, the evaporated filament material becomes deposited on the relatively colder inside wall of the glass envelope blocking the transmission of the light produced by the filament. Long life incandescent lamps can also fail due to filament embrittlement rather than filament evaporation. As tungsten filaments are heated for long periods of time, the filament crystalline structure changes from a random long grain flexible structure to a more rigid short grain structure like glass. This change in the filament material structure to the more rigid short grain structure is commonly referred to as the filament notching effect. Even a slight vibration or shock can cause a notched filament structure to fracture and fail. It has been found that AC lamp operation decreases the filament notching effect two to ten times over that obtainable with pure DC operation. Rectified and unfiltered AC operation offers a compromise in filament life improvement between AC and DC operation as a result of the AC component which is superimposed on the average DC value.[4]

All batteries which are commonly used in flashlights exhibit a loss of voltage output as the battery capacity is consumed with usage. The degree of the voltage loss varies with the type of battery chemistry and electrical load, however, the general shape of the battery voltage output function is relatively similar for all of the types of batteries typically used in flashlights. Fresh battery voltage output begins at a maximum, then drops quite quickly during the first part of the discharge cycle and then slows to a gradual decline for the bulk of the battery capacity. As the battery approaches its end-of-useful life, the voltage reduction rate increases continuously until the rate becomes precipitous at the end-of-life. Battery output voltage is also affected by the battery temperature, especially in the colder regions of operation. From room temperature downward the battery output voltage falls and at the same time the battery internal resistance increases compounding the reduction of the net available battery capacity. In addition, battery voltage output is also affected by the electrical load, and to a lesser extent the battery age, duty cycle, and recovery time.

As an example of typical voltage loss with usage, manganese-alkaline batteries under moderate load at room temperature provide approximately 1.25 volts per cell output when fresh and less than 0.7 volts per cell when the battery capacity nears exhaustion. An incandescent lamp of the type used in flashlights when powered directly by such a manganese-alkaline battery over the life of the battery exhibits a decrease of 7:1 in the light output, a decrease of 3:1 in the power to light conversion efficiency, and a decrease of 1:380 in the incandescent lamp wear out rate.

Room temperature incandescent lamp cold filament resistance is typically only $\frac{1}{6}$th to $\frac{1}{20}$th of that at the normal operating temperatures.[5] When power is first applied to a miniature incandescent lamp, a large current in-rush transient lasting typically only a few milli-seconds occurs which decays quickly as the lamp filament temperature rises to its normal operating value. The peak value of this in-rush current surge is usually somewhat less than would be indicated by the lamp cold-to-hot filament resistance ratio as the battery internal resistance and conductor inductance typically constrain the current delivery capability. In practice, flashlight in-rush currents have been measured to be in the range of 3–10× higher than the steady-state levels. Every time that a flashlight is turned-on, the in-rush current surge thermally shocks the lamp filament weakening the filament structure. The damage to the filament structure produced by the thermal shock is cumulative and can become the dominant lamp failure mechanism if frequent power-on cycling occurs. In addition to lamp life reduction, the large in-rush current transients also increase the current carrying demands placed on the power switch which can become quite costly if high product reliability is required.

The above described shortcomings with respect to current flashlight light generation efficiency and component reliability have been understood from the beginning, however it is only recently that the availability of low cost electronic components has made invention of power supply regulation circuits for improving flashlight performance commercially feasible.

3. Incandescent Lamp Performance[6]

The total light output of a miniature incandescent lamp in the visible region has been found through experimentation to be a function of the applied and design voltages as described by the equation:

$$\frac{L}{L_d} \propto \left[\frac{V}{V_d}\right]^{K_f} \quad (1)$$

where:
- L=Light output at V volts applied to lamp.
- $L_d$=Light output at design voltage $V_d$
- V=Voltage applied to lamp.
- $V_d$=Lamp nominal design voltage.
- $K_f$=Constant between 3.2–3.7 determined experimentally for the particular lamp design. A typical value of 3.5 for $K_f$ will be used in throughout this disclosure.

The corresponding relationship for lamp current has been found to be:

$$\frac{I}{I_d} \propto \left[\frac{V}{V_d}\right]^{K_c} \quad (2)$$

where:
- I=Current at V volts applied to lamp.
- $I_d$=Current at the design voltage $V_d$.
- $K_c$=Constant between 0.52–0.57, determined experimentally for the particular lamp design. A typical value of 0.55 for $K_c$ will be used throughout this disclosure.

Multiplying both sides of Equation 2 by $V/V_d$ provides the expression for lamp power P with $V_r$ defined as the ratio of $V/V_d$ thereby normalizing the expression to the lamp nominal design voltage:

$$P \propto [V_r]^{(1+K_c)} \quad (3)$$

Dividing both sides of Equation 2 by $V_r$ according to Ohm's law provides the lamp filament resistance R:

$$R \propto [V_r]^{(K_c-1)} \quad (4)$$

Dividing light output Equation 1 by power consumption Equation 3 yields the light output efficiency E, proportional to Lumens/Watt:

$$E \propto [V_r]^{(K_f-K_c-1)} \quad (5)$$

And lamp filament life had been found through experiments to obey the following proportionality:

$$\text{Lamp Life} \propto \left[\frac{1}{V_r}\right]^{J} \quad (6)$$

where:
- J=An exponent constant in the range of 10–13 for the type of miniature incandescent lamps used in flashlights. A value of 12 for J will be used throughout this disclosure.

Substituting typical values for small incandescent lamp of 3.5 for $K_f$ and 0.55 for $K_c$ into the Efficiency Equation 5 results in:

$$E \propto [V_r]^{1.95} \quad (7)$$

Substituting typical value for small incandescent lamp of 12 into the Lamp Life Equation 6 results in:

$$\text{Lamp Life} \propto \left[\frac{1}{V_r}\right]^{12} \quad (8)$$

The importance of incandescent lamp voltage regulation can be seen from Equations 7 and 8 which show that incandescent lamp light output efficiency increases at nearly the second power of the applied to design voltage ratio while life decreases at the 12th power of the same ratio.

4. Current Flashlight Performance

A representative flashlight design powered by the most commonly used manganese-alkaline batteries will be described to illustrate current flashlight performance. Subsequently, the current flashlight performance will be compared with a flashlight design using the present invention.

FIG. 1 shows the normalized voltage output curve of a manganese-alkaline battery of a conventionally designed flashlight when that battery is discharged by the direct connection to an incandescent lamp load. The 100% value on the vertical axis indicates the lamp nominal voltage operating point. Current flashlight design practice entails the use of a lamp with a nominal voltage rating which is somewhat lower that the fresh battery output voltage. Although this design practice increases the risk of premature lamp burn-out due to excess voltage when the batteries are fresh, the counterbalancing benefit realized is a substantial improvement in the average lamp output efficiency over the life of the battery as a result of the increased fraction of battery capacity that is discharged more closely to the incandescent lamp nominal voltage operating point.

The battery voltage discharge function shown in FIG. 1 has been derived from a battery manufacturer's[7] "D" cell constant load discharge specification together with Equation 4 which is used to factor in the non-linear resistance characteristics of the incandescent lamp filament. Application of Equations 1, 2, 3, and 5 to the battery voltage output function yields the lamp light output, lamp current, lamp power, and light to power conversion efficiency functions respectively, which are also shown plotted in FIG. 1 with all values normalized to equal 100% at the lamp nominal voltage operating point.

The relatively rapid decline of the light output function with respect to the battery voltage function is the result of the 3.5 power exponent in Equation 1 which becomes applied to the instantaneous battery output voltage. The Lumens/Watt power conversion efficiency function declines somewhat more slowly than the light output function as the lamp power consumption also declines somewhat with the declining battery output voltage. The average of the battery-lamp power conversion efficiency over the life of the battery is indicated by the horizontal line. The difference between 100% power conversion efficiency of an ideal design and the average power to light conversion efficiency of the conventionally designed manganese-alkaline battery powered flashlight defines the theoretical maximum light production improvement opportunity that might achieved with improved voltage control:

$$I_{opp} = \frac{1 - E_{avg}}{E_{avg}} \quad (9)$$

where:
- $I_{opp}$=Maximum Improvement Opportunity
- $E_{avg}$=Average Efficiency For the manganese-alkaline flashlight design example presented in FIG. 1, the average power to light conversion efficiency was shown to be 63%. Substituting that average power to light conversion efficiency into Equation 9 shows that theoretical maximum opportunity for power to light conversion efficiency improvement with improved voltage control is therefore 58%.

5. Prior Art

A voltage regulating circuit to permit constant light output level to be efficiently produced from an incandescent lamp over a wide range of source voltage is disclosed in U.S. Pat. No. 4,230,970. This regulating circuit is described as producing voltage regulation within +/−0.5% over an input voltage range of 6 to 12 Volts by the controlled periodic application of the full source voltage to the incandescent lamp. This regulating circuit utilizes an analog circuit method for providing a mathematical function which controls the timing of a pulse width modulated constant frequency voltage pulse train which is applied to the incandescent lamp. The on-fraction of the pulse width timing is established by the time required for the charging of a timing capacitor to a pre-set constant voltage level by the varying voltage source. When the voltage on the timing capacitor reaches the constant pre-set voltage level, the voltage applied to the lamp is turned-off and the timing capacitor is then discharged. The off-fraction of the pulse train applied to the lamp is determined by the difference between a free-running oscillator time period and the time used for the charging of the timing capacitor.

Another regulating circuit to permit relatively constant light level to be efficiently produced by an incandescent lamp over a wide range of source voltage is disclosed by U.S. Pat. No. 4,237,405. This regulating circuit shares many similarities with the regulating circuit in U.S. Pat. No. 4,230,970 above, varying primarily in the design of the circuit used for the charging and discharging of the timing capacitor and by the replacement of the free-running oscillator with a relaxation oscillator. This circuit is also described as producing regulation within ±0.5% over an input voltage range of 6 to 12 Volts.

Another regulating circuit to permit constant light level to be efficiently produced from an incandescent over a wide range of source voltage is disclosed by U.S. Pat. No. 4,499,525. This regulating circuit has several similarities to the two U.S. Pat. Nos. 4,230,970 and 4,237,405 discussed above including the use of pulse-width application of the full source voltage to the lamp to produce constant RMS power and the use of a timing capacitor for the establishment of the pulse train duty cycle, but differs in the design of the timing capacitor charging and discharging circuit and the oscillator circuits. This regulating circuit utilizes three forward biased diode junctions in series for the establishment of the constant pre-set voltage level used for setting the triggering level of the timing capacitor. The triggering function is implemented with two transistors which, in combination with the forward drop across the three diodes, establish the capacitor voltage triggering level that in turn determines the RMS conversion accuracy. This method and apparatus is shown through measurements to produce regulation within ±7% over an input voltage range of 3 to 6 Volts.

PRESENT INVENTION

The present invention provides an improved, yet relatively inexpensive, method for maintaining constant RMS voltage across an incandescent lamp load over a substantial range of source voltages. By relying primarily on the properties of passive components and closed loop control for the production the constant RMS output, advantages are realized in temperature insensitivity and relaxed component specification requirements. In the present invention semi-conductor variability affects the maintenance of constant RMS output only during the switching transitions which typically comprise less than 3% of the overall cycle time. Furthermore, the semi-conductor switching error contributions during the on-transitions are substantially counter balanced by the error contributions during the off-transitions. The majority of the controller cycle time is comprised of either full-off or saturated conduction where the semiconductor error contributions are minimal or else compensated by the closed loop control methodology. Furthermore, the present invention provides inherent power-off as part of the regulator circuit, a low-voltage warning indication, and a method for supply voltage interrogation not provided by any of the aforementioned inventions.

OBJECT OF INVENTION

An object of this invention is to provide an energy efficient electronic control circuit which maintains a constant and optimum incandescent lamp RMS voltage independent of power source voltage variations.

Another object of this invention, when used with batteries, is to increase the total light output that can be produced from a given battery supply.

Another object of this invention, when used with batteries, is to extend the usability range to lower battery voltage levels for incandescent illumination product applications.

Another object of this invention, when used in conjunction with halogen gas-filled incandescent lamps, is to assure the maintenance of lamp envelope temperatures above the critical temperature required for the halogen-tungsten filament regeneration cycle.

Another object of this invention is to prolong incandescent lamp life by reducing incandescent lamp filament thermal shock at start-up by the gradual application of lamp power.

Another object of this invention is to reduce the incandescent lamp filament notching effect and thereby improve the lamp life by the use of rectified AC power produced from a DC source.

Another object of this invention is to provide a method for determining the voltage of the DC supply which, for batteries, indicates the approximate battery charge level.

Another object of this invention is to provide a low-voltage warning whenever the power supply output drops below a pre-determined level.

Another object of this invention is to provide a battery reserve function that can be manually engaged.

Another object of this invention is to improve illumination product reliability by the replacement of the typically used mechanical high power switch with a more reliable transistor.

BRIEF DESCRIPTION OF DRAWINGS

The details of this invention will be described in connection with the accompanying drawings in which.

BEST MODES FOR CARRYING OUT THE INVENTION

1. Controller with Linear Approximation Method for true-RMS Voltage Development

Figure 2:
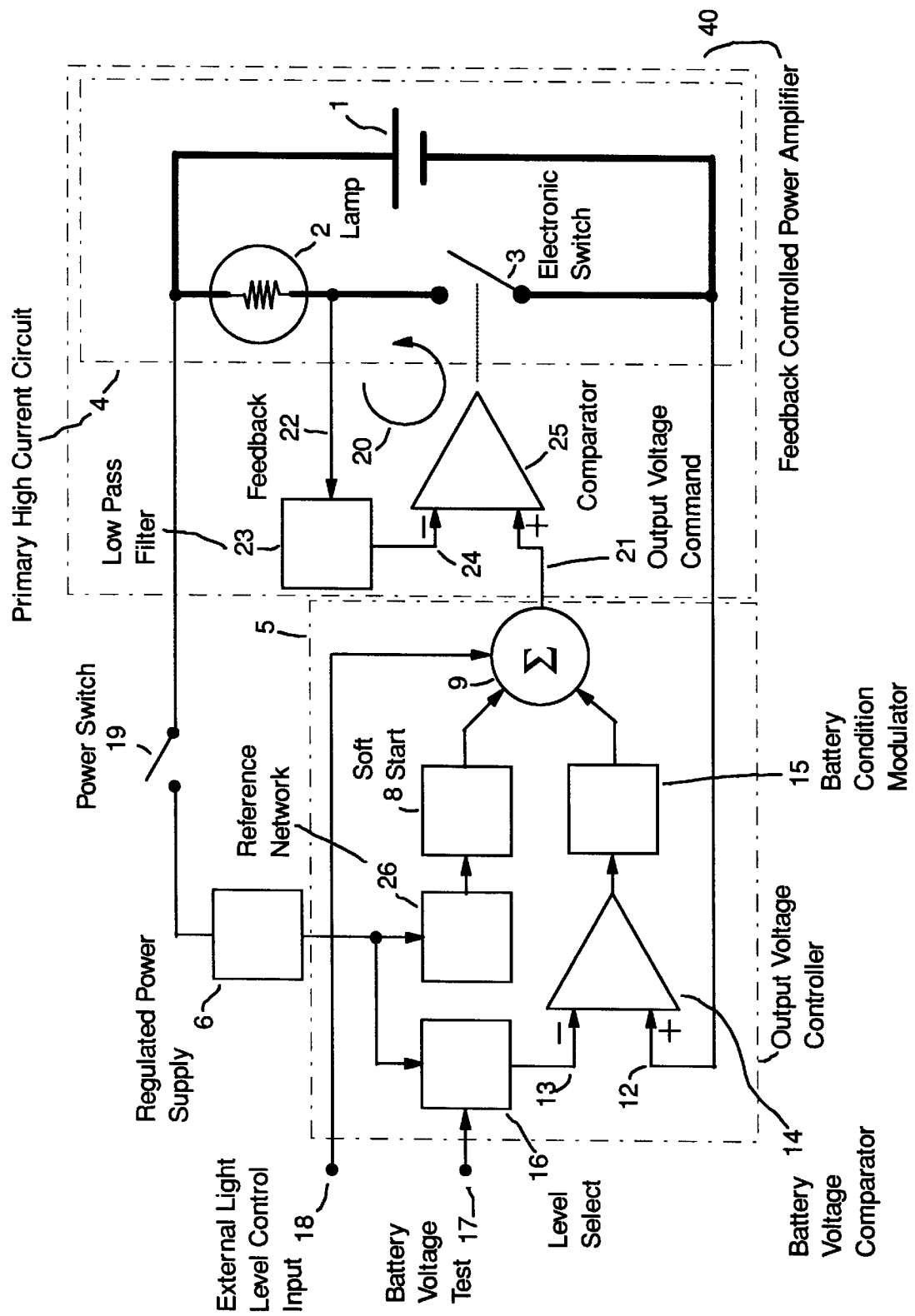
FIG. 2. is a block diagram of the first preferred embodiment of the controller invention which utilizes a linear approximation method for constant voltage development.

The block diagram of the first preferred method for carrying out the high-efficiency incandescent lamp power controller is shown in FIG. 2. The controller consists of an 1) output voltage controller 5, 2) a feedback controlled power amplifier 40 comprised of the primary high current circuit 4, the low pass filter 23, and comparator 25 and 3) a regulated power supply 6. The feedback controlled power amplifier responds to the output voltage controller 5 which generates an output voltage command 21 signal that controls the gradual power application to the lamp 2 at power-up, maintains constant lamp 2 RMS voltage during steady-state operation, and modulates lamp light output when communicating the battery 1 output voltage to the user. The regulated power supply 6 provides a fixed voltage reference used for comparison purposes by the output voltage controller 5 and supplies power to all components contained in the controller with the exception of those components comprising the primary high current circuit 4 which are powered directly by the battery 1.

The feedback controlled power amplifier control loop 20, comprised of the voltage waveform applied to the lamp 2, the low pass filter 23, comparator 25, and electronic switch 3, is designed with very high gain and 180° phase shift to ensure saturated oscillation. The principles of operation of the feedback controlled power amplifier with be described in conjunction with FIG. 2 and the voltage timing diagram shown in FIG. 3.

When the voltage applied to the lamp 2 is off, the feedback voltage 22 becomes zero and the voltage output 24 from the low pass filter 23 exhibits a gradually decreasing trend with time. When the low pass filter voltage output 24 falls below the voltage output command voltage 21, comparator 25 triggers closing electronic switch 3 which applies the full battery 1 voltage to the lamp 2. Application of the full battery 1 voltage to lamp 2 raises the feedback signal 22 which produces an increasing voltage trend on signal line 24 from the low pass filter 23. When the low pass filter 23 output voltage 24 rises above the voltage output command signal voltage 21, the comparator 25 triggers shutting-off the electronic switch 3 which shuts-off the application full battery 1 voltage to the lamp 2. Shutting-off electronic switch 3 results in zero feedback voltage 22 and a decreasing voltage trend with time on signal line 24 from the low pass filter 23. The cycle of oscillation repeats when the voltage output from the low pass filter 23 on signal line 24 falls below the output voltage command signal 21 and the comparator 25 turns-on again. This oscillation cycle of the feedback control loop 20 continues as long as the battery 1 voltage exceeds the lamp 2 voltage rating which enables the output from the low pass filter 23 to rise above the voltage output command signal 21 and turn the comparator 25 off. When the battery 1 voltage falls below the lamp 2 voltage rating, the comparator 25 then remains in the continuous on-position holding electronic switch 3 in the closed position and applying the full battery 1 voltage to the lamp 2.

Figure 3:
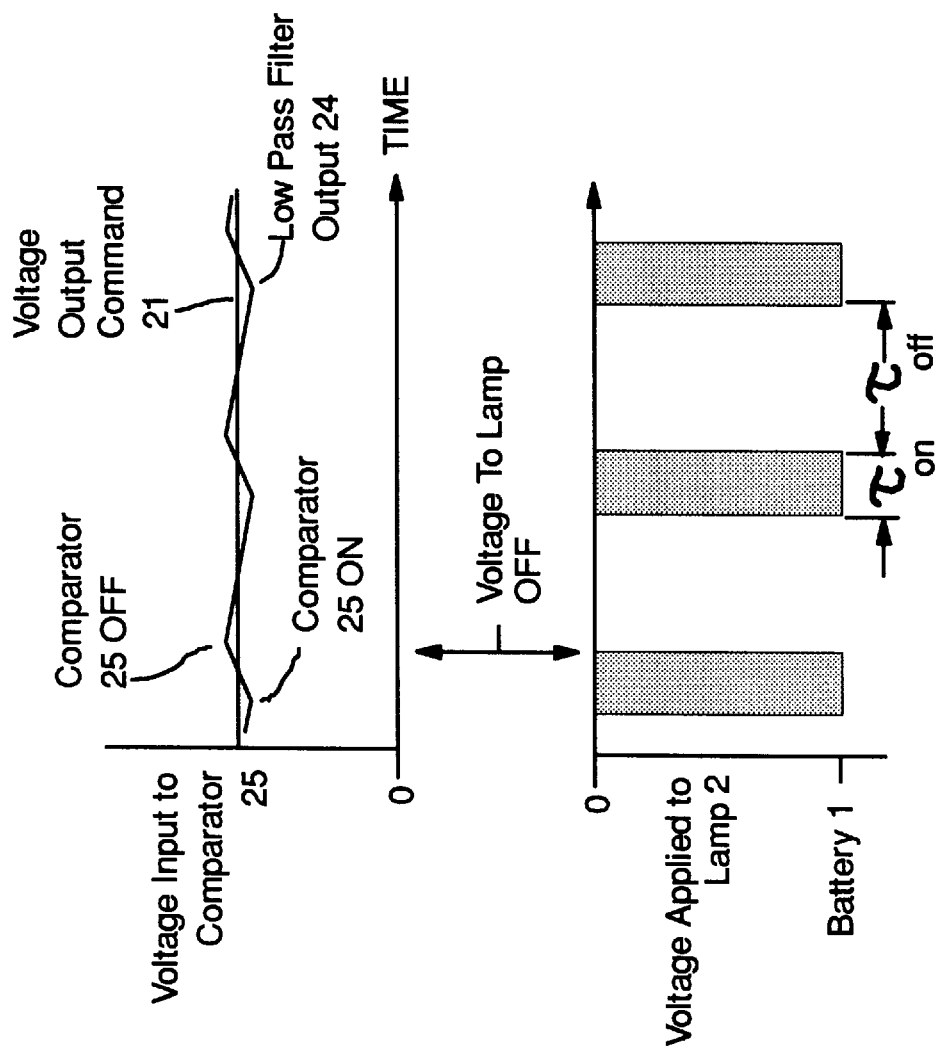
FIG. 3. are the feedback controlled power amplifier voltage waveforms of the first preferred embodiment of the controller invention.

The full battery 1 voltage, represented by the shaded rectangles in FIG. 3, is applied to the lamp 2 by the oscillation action of the feedback controlled amplifier 40 with very short duration pulses which are repeated at a much faster rate than the lamp 2 filament thermal response time. The lamp 2 filament thermal inertia acts as a low pass filter of the power contained in the pulse train producing a constant light output level determined by RMS power content of the applied pulse train. The DC equivalent electrical power contained in the voltage pulse train applied to the lamp 2 is described by:

$$V_{dc}^2 = V_b^2 \cdot \frac{\tau_{on}}{\tau_{on} + \tau_{off}} \qquad (10)$$

Where
 $V_{dc}$=DC RMS equivalent voltage
 $V_b$=Battery voltage
 $\tau_{on}$=time that battery voltage is applied to the lamp
 $\tau_{off}$=time that battery voltage is not applied to the lamp
Defining a duty cycle parameter $D_t$ as the fraction of time that battery voltage is applied to lamp as:

$$D_t = \frac{\tau_{on}}{\tau_{on} + \tau_{off}} \qquad (11)$$

Re-arranging Equation 10 for the duty cycle $D_t$ yields:

$$D_t = \frac{V_{dc}^2}{V_b^2} \qquad (12)$$

For constant RMS to be produced by the present invention, the duty cycle as a function of the battery 1 voltage $V_b$ is described by Equation 12 when the lamp 2 voltage rating is substituted for the $V_{dc}$ term.

The control algorithm in the present invention adjusts the duty cycle $D_t$ of the battery voltage pulse train applied to the lamp 2 by the switch 3 such that relatively constant RMS equivalent of lamp 1 DC voltage rating is maintained in the useable voltage range of the battery 1. As the battery 1 voltage declines with usage, the control algorithm increases the duty cycle of the voltage pulse train applied to the lamp 1 thereby increasing the average current drawn from the battery 1 by the lamp 2. The average power drawn from the battery 1 remains relatively constant over the usable voltage range of the battery 1 as the increase in the average current drawn from the battery 1 compensates for the battery 1 voltage reduction. When the battery 1 voltage output falls below the lamp 2 DC rated voltage, the pulse train merges into continuous application of the full battery 1 voltage to the lamp 2 ending the regulation function of the controller. The remaining battery 1 capacity is discharged with the electronic switch 3 latched-up in the continuous-on position which connects the lamp 2 directly to the battery 1 as would occur in a conventionally designed flashlight.

In a typical design application of this invention the lamp 2 voltage rating would be selected to be equal to or slightly higher than the battery 1 end-of-life voltage in order to provide regulation over most of the usable battery 1 voltage range while at the same time minimizing the current levels in the primary high current circuit 4 loop. For example, a 6–7V lamp 2 might be used with an 8 cell 12V manganese-alkaline battery 1 supply.

In the present invention, during steady-state operation, the voltage output command signal 21 is a DC voltage level which is varied linearly as a function of the battery 1 output voltage. This linear relationship between the voltage output command signal 21 and the battery 1 voltage output is required by this circuit topography for the maintenance of relatively constant RMS voltage output to the lamp 1 as explained below.

When constant RMS DC voltage is applied to the lamp 2 by a saturating square waveform, the $V_{dc}^2$ term in Equation 12 can be replaced with a constant and Equation 12 can be reduced to a proportionality:

$$D_t \propto \frac{1}{V_b^2} \tag{13}$$

The output from the low pass filter 23 applied to the negative input 24 of comparator becomes the average $V_{avg}$ of the saturating voltage waveform applied to the lamp 2 which is expressed by:

$$V_{avg} = D_t V_b \tag{14}$$

Substituting the right hand side of Equation 13 for $D_t$ in Equation 14 yields the relationship between the average voltage of a repetitive voltage square wave as a function of the supply voltage when constant RMS voltage is maintained:

$$V_{avg} \propto \frac{1}{V_b} \tag{15}$$

If the voltage function described by the right hand side of Equation 15 is applied to the voltage command input 21 of the circuit in FIG. 2, then the feedback controlled amplifier 40 will produce constant RMS output independent of the battery 1 voltage $V_b$. It then follows that, for relatively constant RMS output to be produced by the present invention, the voltage command signal 21 provided by the voltage output controller 5 must duplicate as closely as possible the mathematical relationship described by equation 15.

Figure 4:
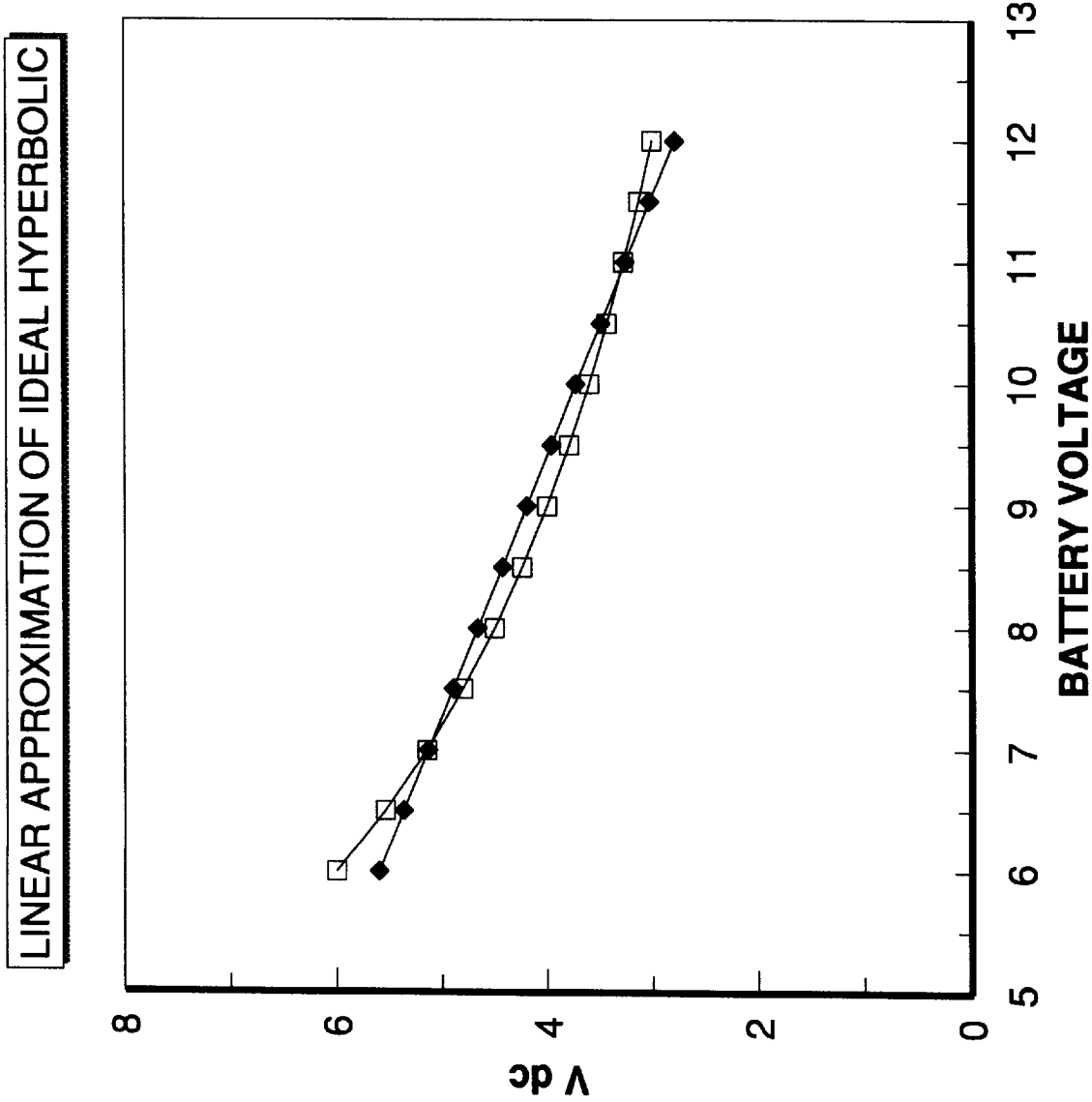
FIG. 4. is a diagram showing the accuracy comparison of the linear approximation method used in the first preferred embodiment of the invention in comparison with the mathematically ideal hyperbolic.

The present invention takes advantage of the fact that batteries 1 of the type used in flashlights have a comparatively narrow $V_b$ excursion range between full capacity and nearly depleted capacity enabling the use of a more easily produced linear approximation of the hyperbolic function on the right hand side of Equation 15. In FIG. 4, Equation 15 is shown plotted over a 2:1 battery voltage range which encompasses the extreme usable voltage range of all of the types batteries commonly used in flashlights. The best fit linear approximation to the hyperbolic function is also shown plotted on the same graph. Over the factor of 2:1 battery voltage excursion range illustrated in FIG. 4, the average deviation between the mathematically ideal hyperbolic function described by Equation 15 and the linear approximation is less than 3.5%. The accuracy of this approximation method improves rapidly for the typically narrower battery voltage excursion ranges that would be encountered in most flashlight designs.

Figure 5:
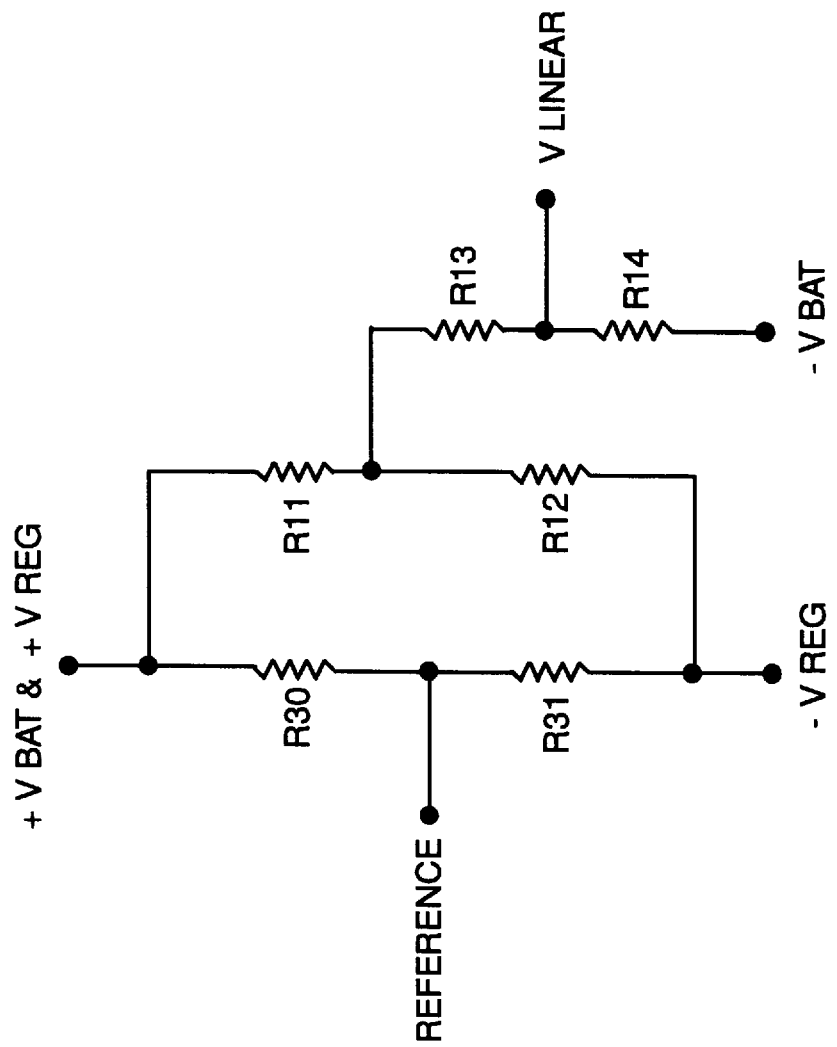
FIG. 5. is the design implementation of the reference network used in the first preferred embodiment of the invention which approximates the function necessary for the present invention to produce ideally constant RMS voltage output.

The linear approximation shown graphically in FIG. 4 is implemented within the reference network 26 shown in FIG. 2 with the use of a network of 6 resistors connected as shown in FIG. 5.

Equal value resistors R30 and R31 divide the fixed voltage output of the regulated power supply 6 producing a fixed voltage level which provides the voltage reference level for the linear voltage generator comprised of the resistors R11, R12, R13, and R14. Resistors R30 and R11 are connected to the battery 1 positive voltage terminal which is common with the positive output of the regulated power supply 6. Resistors R31 and R12 are connected to the negative output of the regulated power supply 6 with resistor R14 connected to the negative output of the battery 1. The output of the linear network is identified by the V Linear label.

The values of resistors R11, R12, R13, and R14 are determined by setting up an equation for V Linear output voltage as a function of the battery voltage. One of the resistor values is assigned arbitrarily setting the scale factor for the other three resistor values. Substitution of the numerical values of two points from the linear approximation line in FIG. 4 produces two simultaneous equations with three variables indicating that a multiplicity of solutions exist. The two simultaneous equations can be then reduced to a single function with two variables to determine the region of real value solutions. Assignment of one more of the three remaining resistor resistance values enables determination of the remaining two resistor resistance values.

During steady-state controller operation the voltage function produced by the reference network 26 in FIG. 2 passes unchanged through the soft start 8 and the summer 9 and becomes the voltage output command 21 signal controlling the maintenance of constant RMS voltage output from the feedback controlled amplifier 40. The soft start 8 and summer 9 enable attenuation of the signal produced by the reference network 26 to produce corresponding reductions in the RMS voltage applied to the incandescent lamp 2 by the feedback controlled amplifier 40. During controller power-up, the soft start 8 circuit slows the rise of the voltage provided by the reference network 26 which results in a correspondingly gradual RMS power application to the lamp 2 by the feedback controlled power amplifier 40. The summer 9 provides a means for modulation of lamp 2 light output from an external light level control input 18 signal as well as from the internal battery condition modulator 15 which communicates the battery voltage output condition to the user by the modulating the lamp 2 light output.

The battery 1 voltage output is monitored by the battery comparator 14 and when the battery voltage falls below a pre-set limit, the difference between the current battery voltage output and the pre-set limit is coded by the battery condition modulator 15 into periodic signals which are then applied to the summer 9. The periodic signals from the battery condition modulator 15 reduce the voltage output command 21 signal which produces a corresponding periodic reduction in the lamp 2 output brightness.

Battery 1 output voltage monitoring is implemented by the application of scaled battery voltage to the positive input 12 of the battery comparator 14. The negative input 13 to the battery comparator 14 which acts as the set point is connected to level select 16 which supplies a fixed pre-set voltage level derived from the regulated power supply 6 with the use of resistor dividers. As long as the battery 1 voltage applied in a scaled form to the negative input 12 exceeds the voltage applied to the positive input 13 from the level select 16, the battery voltage comparator 14 does not trigger. Whenever the battery 1 voltage in a scaled form applied on the positive input 13 falls below the voltage applied on the negative input 12, the battery comparator 14 triggers, holds in the triggered position a time period which is approximately proportional to the difference between voltages on the inputs 12 and 13, and then resets. After resetting, the battery comparator holds in the reset position for a fixed time period and then repeats the triggering action. The triggering and resetting cycle of the battery voltage comparator 14 repeats in an oscillatory manner.

Battery 1 output voltage testing is accomplished by the activation of the battery voltage test 17 switch which results in the application by the level select 16 of the scaled equivalent of the highest fresh battery voltage to the battery comparator 14 negative input 13. As the voltage applied to 12 by the battery 1 will always be less than the voltage on 13, the battery comparator 14 will trigger and then reset repetitively. The periodic waveform produced by the oscillation action of the battery comparator 14 in conjunction with the battery condition modulator 15 is applied the summer 9 to reduce the light output command 21 signal correspondingly which is amplified by the feedback controlled power amplifier 40 producing corresponding modulation of the lamp 2 light output. The modulation pattern of the lamp 2 light provides a visual indication to the user of the voltage output condition of the battery 1. When the battery 1 voltage output is near the highest fresh battery voltage, the duty cycle of the oscillation produced by the battery comparator results in a predominant fraction of full brightness light output from the lamp 2. When the battery 1 voltage output is low near the end-of-useful life, the oscillation produced by the battery comparator 14 results in a predominant fraction of reduced light output from the lamp 2. Between the extremes of the highest fresh battery voltage and near the end-of-useful life, the lamp 2 average light output varies as a function of the battery voltage output condition indicating the battery charge condition to the user.

A battery-low warning feature alerts the flashlight user whenever the battery 1 voltage output falls below a predetermined voltage level indicating that a limited flashlight operating time remains before the batteries are completely exhausted. The battery-low warning feature is engaged whenever the battery voltage test 17 is not activated. When the battery voltage test 17 is not activated, the level select 16 applies to the battery comparator 14 a fixed voltage 13 derived from the regulated power supply 6 which establishes the battery-low voltage warning level. Whenever the battery 1 voltage output drops below the pre-established battery-low voltage warning level, the battery comparator triggers and establishes the oscillation and signaling pattern of the battery condition modulator 15 described previously in conjunction with the battery voltage test 17 function.

Figure 6:
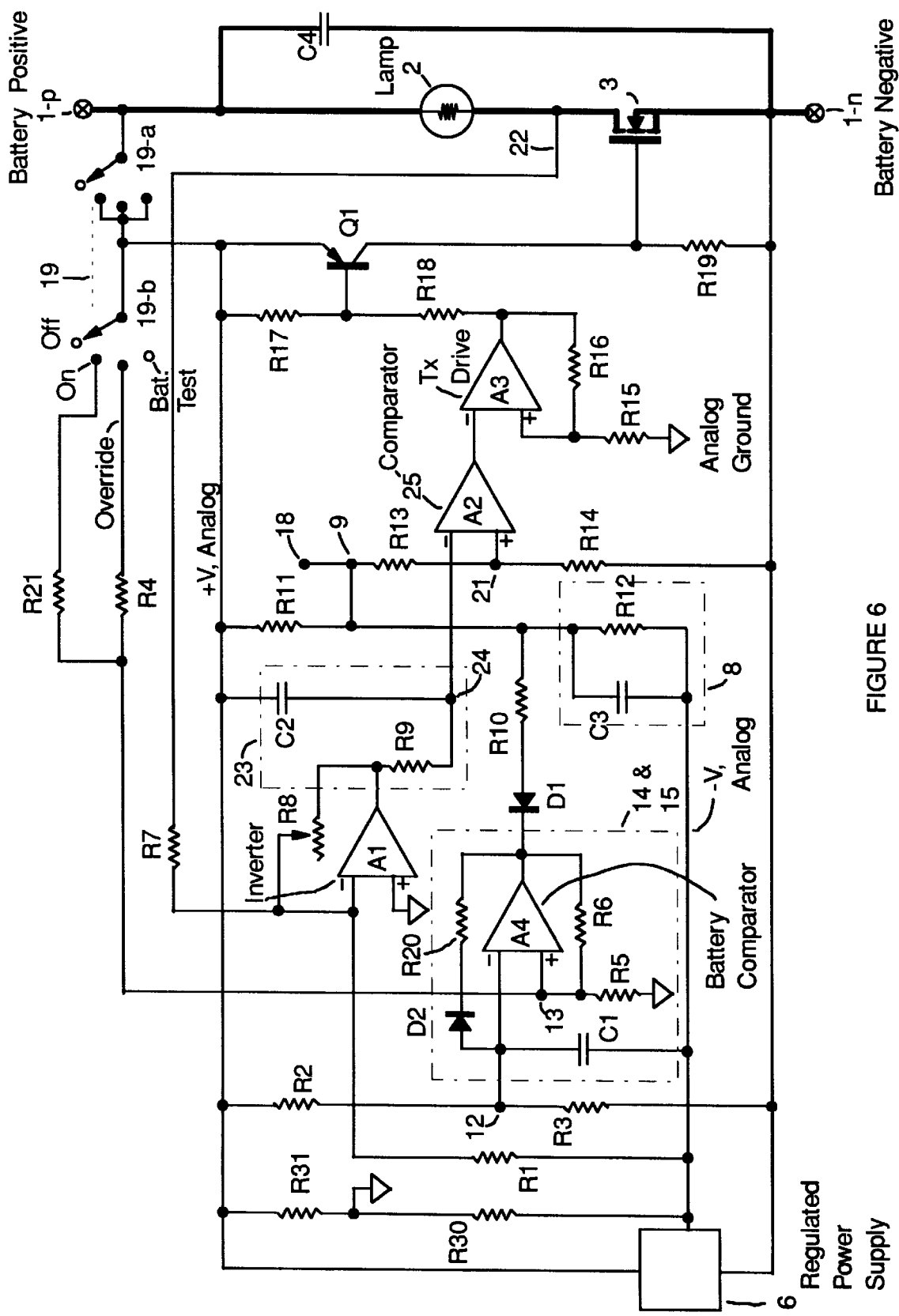
FIG. 6. is the circuit diagram of the first preferred controller embodiment which utilizes the linear approximation method for constant voltage development.

FIG. 6 shows the circuit implementation of the first preferred embodiment of the present invention which makes use of the linear approximation method for constant RMS output voltage development.

All functions of the controller circuit operation are controlled by switch 19 which consists of two coupled decks with four positions each. Deck 19-$a$ provides the controller circuit power on-off function by the application of battery 1 power to the regulated power supply 6 and deck 19-$b$ provides the means for controlling the battery voltage testing features. The first power-on position of the switch 19 identified by the On label engages the normal operating mode of the controller circuit. In the normal operating mode the controller circuit provides constant RMS voltage to the lamp 2 and when the battery 1 voltage output falls below the pre-defined low-battery voltage level, the controller signals a warning by flashing the lamp 2 light output. When the battery 1 voltage output is below the pre-defined low-battery voltage level, the lamp flashing pattern indicates the battery voltage output by the duty cycle of the flashing pattern. The second power-on position of the switch 19 identified by the Override label restores continuous light output by disabling the battery 1 low-battery voltage detector and continues to provide constant RMS voltage to the lamp 2 until the battery capacity is depleted. The third power-on position of the switch 19 identified by the Bat Test label enables interrogation of the battery 1 supply output voltage condition. With switch 19 in the Bat Test position, the controller signals the battery 1 voltage output condition at all times by the duty cycle of the lamp 2 light output flashing pattern.

When the controller power-on switch 19 is in the Off position as shown, Q1 collector voltage is at the battery negative potential 1-$n$ and resistor R19 shorts any residual source to gate voltage that may be present across the enhancement mode N-MOS switch transistor 3. When the source and gate voltages of the enhancement mode N-MOS transistor 3 are equal, the transistor exhibits very high source to drain resistance which shuts-off the battery 1 current to the lamp 2. The high resistance value of feedback resistor R7 reduces the current flow through resistor R7 path to a negligibly small level in comparison with the self-discharge rate of the battery 1. With the power-on switch 19-$a$ in the Off position as shown, the electrical current flow in the two available battery paths is thereby reduced to negligibly small levels eliminating the need for a high power switch for the control of the large battery currents drawn by the lamp 2.

When the power switch 19 is placed in the normal operating On position, battery positive 1-$p$ is connected to the +V Analog applying power to the regulated power supply 6 which provides power to the four operation amplifiers A1 through A4 that make up the control logic portion of the controller circuit. Regulated power supply 6 output voltage identified by the −V Analog label is divided by the equal value resistors R30 and R31 producing an Analog Ground voltage used as a signal processing voltage reference level by operational amplifiers A1, A3, and A4.

Operational amplifier A1 provides a high input impedance buffer for the lamp feedback current path through resistor R7, and also inverts and scales the voltage waveform applied to the lamp 2 by the switch 3. Equal value resistors R7 and R1 form a divider which shifts to Analog Ground the feedback voltage applied to operational amplifier A1 when the transistor 3 is shut off. When transistor 3 is switched to it's saturated conduction state, the feedback voltage at 22 becomes essentially equal to the battery negative 1-$n$ potential and current is drawn through resistor R7 driving the output of operational amplifier A1 in the positive direction. The resistance values of R8, R7, and R1, which set the gain of amplifier A1, are chosen so that when the maximum battery design voltage is applied to lamp 2, the output of operational amplifier A1 remains within the linear region of output. Potentiometer R8 enables adjustment of amplifier A1 gain which scales the feedback signal and thereby provides the means for adjustment of the RMS voltage that is applied to the lamp 2 by the controller.

Resistor R9 and capacitor C2 form a low pass filter 23 which averages the output waveform of operational amplifier A1 producing a DC voltage with respect to Analog Ground which is proportional to the average voltage applied to the lamp 2. The DC voltage proportional to the average voltage applied to the lamp 2 provides the lamp feedback signal 24 which is applied to the negative input of comparator A2.

The positive input 21 to comparator A2 is the voltage output command signal produced by the reference network comprised of resistors R11, R12, R13, and R14 described in conjunction with FIG. 5. During initial power-on of the controller, capacitor C3, which is connected across resistor R12, slows the voltage rise at circuit junction 9 which in turn slows the rise of the voltage output command signal 21 thereby providing the lamp soft-start function. External light level control input 18 and the battery condition modulator input applied by resistor R10 are also connected to circuit junction 9 which acts as a summer for the positive input 21 to comparator A2. Application of a negative voltage by C3 or R10 relative to the voltage at circuit junction 9 reduces the output voltage command 21 signal which produces a corresponding reduction in the RMS voltage that will be applied to the lamp 2 by the controller.

Operational amplifier A3 provides an inversion of the A2 comparator output and speeds-up the switching transitions through the use of positive feedback implemented with resistors R15 and R16. Transistor Q1 amplifies the signal swing of operational amplifier A3 to the full range of the battery voltage from 1-$p$ to 1-$n$ and controls the switching action of power transistor 3. The switching action of power transistor 3 regulates the current flow to the lamp 2 between full-conduction or full-off with rapid transitions in between. Filter capacitor C4 connected across the battery terminals 1-$p$ and 1-$n$ stores battery 1 charge during the off-period of the power transistor 3 and then supplies the stored battery 1 charge to the lamp 2 during the conduction-period of power transistor 3. Capacitor C4 averages the current drawn by the lamp 2 reducing the battery 1 peak current demand which reduces the losses associated with the battery 1 internal resistance.

When the power-on switch 19-$a$ is moved from the Off to the On position, the transistor switch 3 will be found to be in the high resistance state blocking current flow to the lamp 2. With the current flow to the lamp 2 blocked, the lamp feedback 22 potential becomes battery positive 1-$p$ and equal value resistors R7 and R1 apply the equivalent of an open circuit Analog Ground potential to the negative input of A1. With equal Analog Ground potentials at the positive and negative inputs to A1, the A1 output approximates Analog Ground potential. The approximately Analog Ground output from A1 drives the voltage at 24 to Analog Ground at a rate based on the time constant of the R9 and C2 combination which in a typical design would be made to be of the order of 100 $\mu$sec. The voltage output command 21 rises gradually as the voltage across resistor R12 is initially absorbed by capacitor C3. In a typical design the time constant of R12 and C3 would be made to be of the order of 1 sec. When the voltage output command potential 21 rises above the Analog Ground potential, the comparator A2 triggers producing a positive voltage output which switches transistor driver A3 output to saturated negative potential. The positive feedback of transistor driver A3 steepens the transition slope and switches the voltage translator transistor Q1 into saturated conduction which in turn switches the low $R_{ds}$ N-MOS transistor 3 into saturated conduction thereby applying the full battery voltage 1 to the lamp 2.

With transistor 3 in full saturated conduction, the feedback voltage at 22 drops to essentially the battery negative 1-$n$ potential which, through feedback resistor R7, drives A1 output in the positive voltage direction in proportion to the battery 1 output voltage at that time. Low pass filter 23 formed by R9 and C2 in the presence of a fast transition input from A1 responds as an integrator producing a voltage ramp with a positively rising trend which is applied to the comparator A2 negative input 24. When the voltage to comparator A2 negative input 24 rises above the voltage output command potential 21, comparator A2 triggers producing a negative voltage output in turn switching A3, Q1, turning off transistor 3 and shutting off the current to the lamp 2. This switching sequence of A1, A2, A3, Q1, and transistor 3 establishes the oscillation cycle of the feedback controller power amplifier. The feedback controlled power amplifier frequency is determined primarily by the time constant of the low pass filter 23 and the slew rate of comparator A2. Typical feedback controlled power amplifier oscillation frequencies employed in designs might be in the range of 1000–5000 Hz determined at the lower extreme by power supply filtering requirements and at the upper extreme by the AC switching losses and active component costs.

Comparator A2 adjusts the duty cycle of the battery 1 voltage applied to the lamp 2 by matching the processed feedback voltage signal applied to the negative input 24 with the voltage output command signal 21. The electrical output voltage tracking response time of the controller with respect to the voltage output command signal 21 is within one oscillation period of the feedback loop. As the output command voltage applied at 21 continues to rise as capacitor C3 continues to be charged, the RMS voltage applied to the lamp rises correspondingly thereby providing the lamp 2 soft-start function. When C3 becomes fully charged and in the absence of any other input to summing junction 9, the voltage output command 21 is determined solely by the reference network comprised of resistors R11, R12, R13, and R14, the fixed voltage provided by the regulated power supply 6, and the battery 1 output voltage.

Scaling of either the output voltage command 21 or the feedback voltage 24 with respect to the other enables adjustment of RMS voltage applied to the lamp 2 by the controller circuit. Potentiometer R8 is provided in the negative feedback path of A1, which together with the values of resistors R1 and R7, sets the gain of A1 and provides the means for adjustment of the RMS voltage applied to the lamp 2 by the controller. When the battery 1 voltage output drops below the lamp 2 nominal voltage after the controller circuit has been adjusted to produce the RMS voltage output equal to the lamp 2 nominal voltage, the feedback voltage at 24 will become insufficient for turning-off the comparator A2 and the lamp power transistor 3 will remain in the on-position continuously applying the full battery voltage 1 to the lamp 2.

The components comprising the battery comparator 14 and battery condition monitor 15 functional blocks described in conjunction with FIG. 2 are identified in FIG. 6 by the 14 & 15 labels. The level select 16 functional block described in conjunction with FIG. 2 is comprised of components 19-$b$, R21, R4, R2, and R3 in FIG. 6. The battery voltage comparator A4 positive input is connected to Analog Ground through resistor R5 with resistor R6 providing positive feedback which sets the switching hysterisis range for battery voltage comparator A4.

When the battery test switch 19-$b$ is placed in the Bat Test position which is an open connection, the voltage at 13 remains essentially equal to Analog Ground as the value of resistor R5 is made to be much smaller than the value of resistor R6. The resistance values of resistors R2 and R3 are selected so that, when the maximum battery 1 design voltage is connected to the controller circuit, the voltage at junction 12 of the divider formed by resistors R2 and R3 is equal to Analog Ground potential assuring that, operational amplifier A4 will always trigger whenever the controller is connected to a battery providing design voltage output. The triggering of battery comparator A4 drives the voltage output of A4 negative, drawing current through blocking diode D1 and resistor R10 which reduces the lamp output command voltage 21 in turn reducing the RMS voltage applied to the lamp 2 by the controller. After A4 has triggered, the negative output voltage of A4 draws current through Resistor R20 and diode D2 from capacitor C1 lowering the voltage at junction 12 until the voltage at junction 12 falls below the voltage at 13 and the battery comparator A4 resets to positive voltage output. The positive voltage output of A4 is blocked by the diode D2 ending the current draw from C1. The voltage at junction 12 then rises with a rate proportional to the battery voltage 1-$n$ and as a function of the R3 and C1 time constant. When the voltage at 12 rises above the voltage at 13, the battery comparator A4 triggers again and the cycle of oscillation of comparator A4 repeats.

Placing the switch 19-$b$ in the normal operation On position engages resistor R21 which raises the voltage at junction 13 to equal a voltage which would be produced at junction 12 by a battery whose voltage output has fallen to a pre-defined low-battery 1 voltage warning level. During normal operation, when the battery 1 output voltage falls below the pre-defined low-battery voltage warning level, battery comparator A4 will trigger and go into oscillation as was described previously in conjunction with placement of switch 19-$b$ in the Bat Test position. The oscillation of battery comparator A4 will produce a very brief interval of dimmed lamp 2 light output and then the restoration of full lamp 2 light output for a substantially longer interval. The predominantly full light output duty cycle of the lamp 2 informs the user that the battery 1 voltage output has just fallen below the low-voltage warning value. Having been warned that the battery 1 output voltage has fallen to the low-battery output voltage level, the user then can choose to move the switch 19-$b$ to the Override position which engages resistor R4 and raises the voltage at junction 13 to equal the voltage produced at junction 12 by a battery whose voltage output has fallen below the minimum usable level. With switch 19-$b$ in the Override position, the battery voltage will always exceed the triggering level of the battery comparator A4 and the lamp 2 will continue produce full light output until the battery 1 capacity is depleted.

2. Controller with True-RMS Converter

Figure 7:
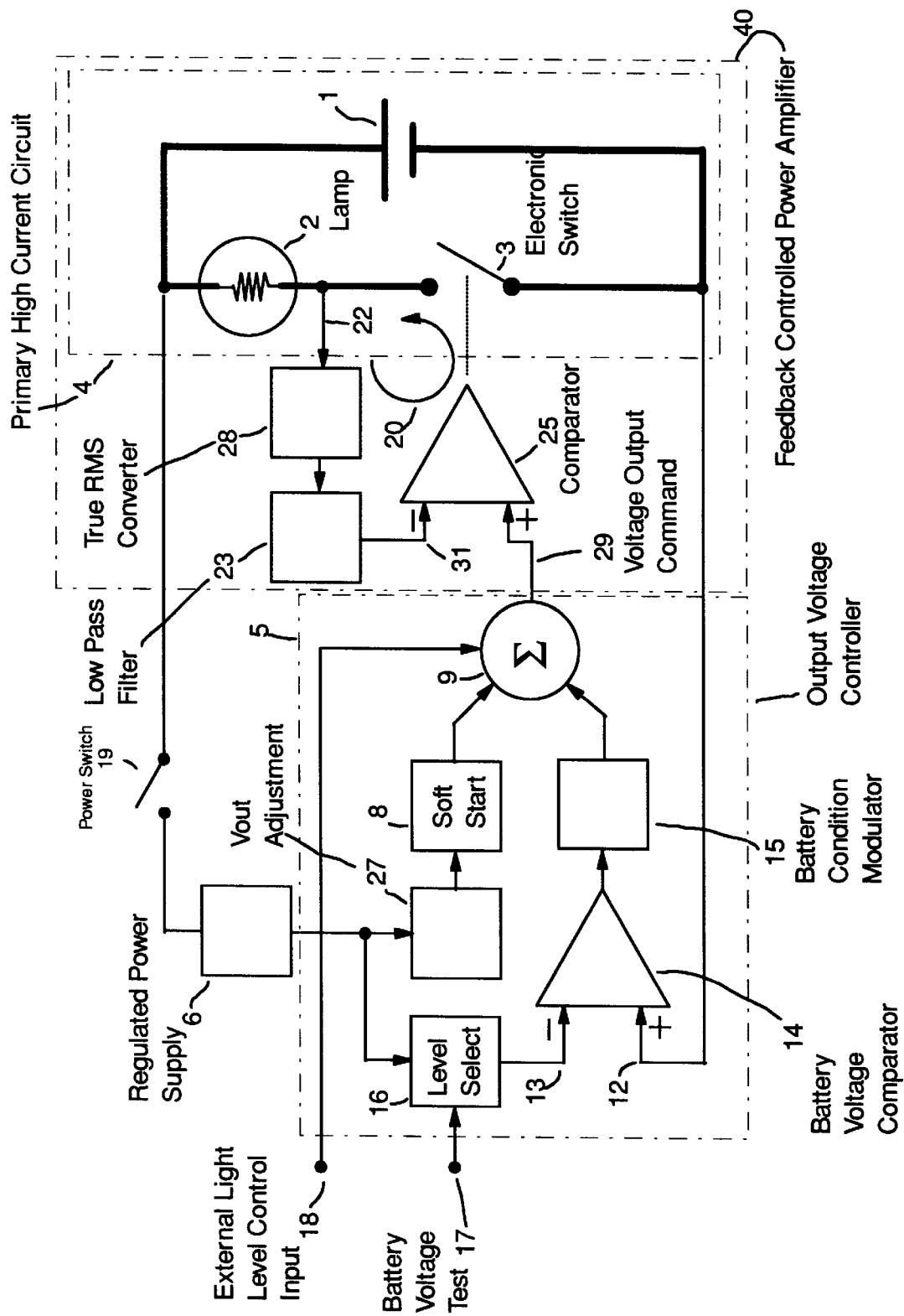
FIG. 7 is a block diagram of the second preferred embodiment of the controller invention which utilizes a true-RMS converter.

The block diagram of the second preferred method for carrying out the high-efficiency incandescent lamp power controller is shown in FIG. 7. This method improves the voltage regulation accuracy of the first method by the incorporation of a true-RMS converter 28 in the feedback loop 20. The true-RMS converter 28 replaces the A1 operational amplifier in the first preferred method and eliminates the need for the reference network. A voltage divider contained in the $V_{out}$ adjustment 27 block is used for setting the RMS output voltage applied to the lamp 2 by the controller. The description of the second preferred method for carrying out the invention will be limited to those aspects that differ from the first preferred method.

The controller consists of an 1) output voltage controller 5, 2) a feedback controlled power amplifier 40 comprised of the primary high current circuit 4, true-RMS converter 28, the low pass filter 23, and comparator 25 and 3) a regulated power supply 6. The feedback controlled power amplifier responds to the output voltage controller 5 which generates an output voltage command 29 signal that controls the gradual power application to the lamp 2 at power-up, maintains constant lamp 2 RMS voltage during steady-state operation, and modulates lamp light output when communicating the battery 1 output voltage to the user. The regulated power supply 6 provides a fixed voltage reference used for comparison purposes by the output voltage controller 5 and supplies power to all components contained in the controller with the exception of those components comprising the primary high current circuit 2 which are powered directly by the battery 1. The feedback controlled power amplifier 40 behaves as a linear voltage amplifier of the voltage output command 29 signal provided by the output voltage controller 5.

The feedback controlled power amplifier control loop 20, comprised of the voltage waveform applied to the lamp 2, true-RMS converter 28, the low pass filter 23, comparator 25, and electronic switch 3, is designed with very high gain and 180° phase shift to ensure oscillation. The principles of operation of the feedback controlled power amplifier are the same as were be described in conjunction with the voltage timing diagram shown in FIG. 3 for the first preferred method for carrying out the invention.

In FIG. 7, the true-RMS converter 28 produces the instantaneous RMS voltage of the pulse train applied to the lamp 2 as referenced to the battery 1-$p$ positive potential. The low pass filter 23 averages output of true-RMS converter 28 developing the feedback signal 31 which is proportional to the RMS voltage applied to the lamp 2. The feedback signal 31 is applied to comparator 25 negative input with the positive input 29 being the voltage output command 29 signal as well as the summer 9 junction. An adjustable voltage divider across the regulated power supply 6 contained in the $V_{out}$ adjustment 27 block is used for setting the steady-state RMS voltage to be applied to the lamp 2 by the controller. The soft start 8, supply voltage test 17, comparator 14, battery condition modulator 15, and summer 9 remain unchanged both in function and design from the first method for carrying out the invention.

Figure 8:
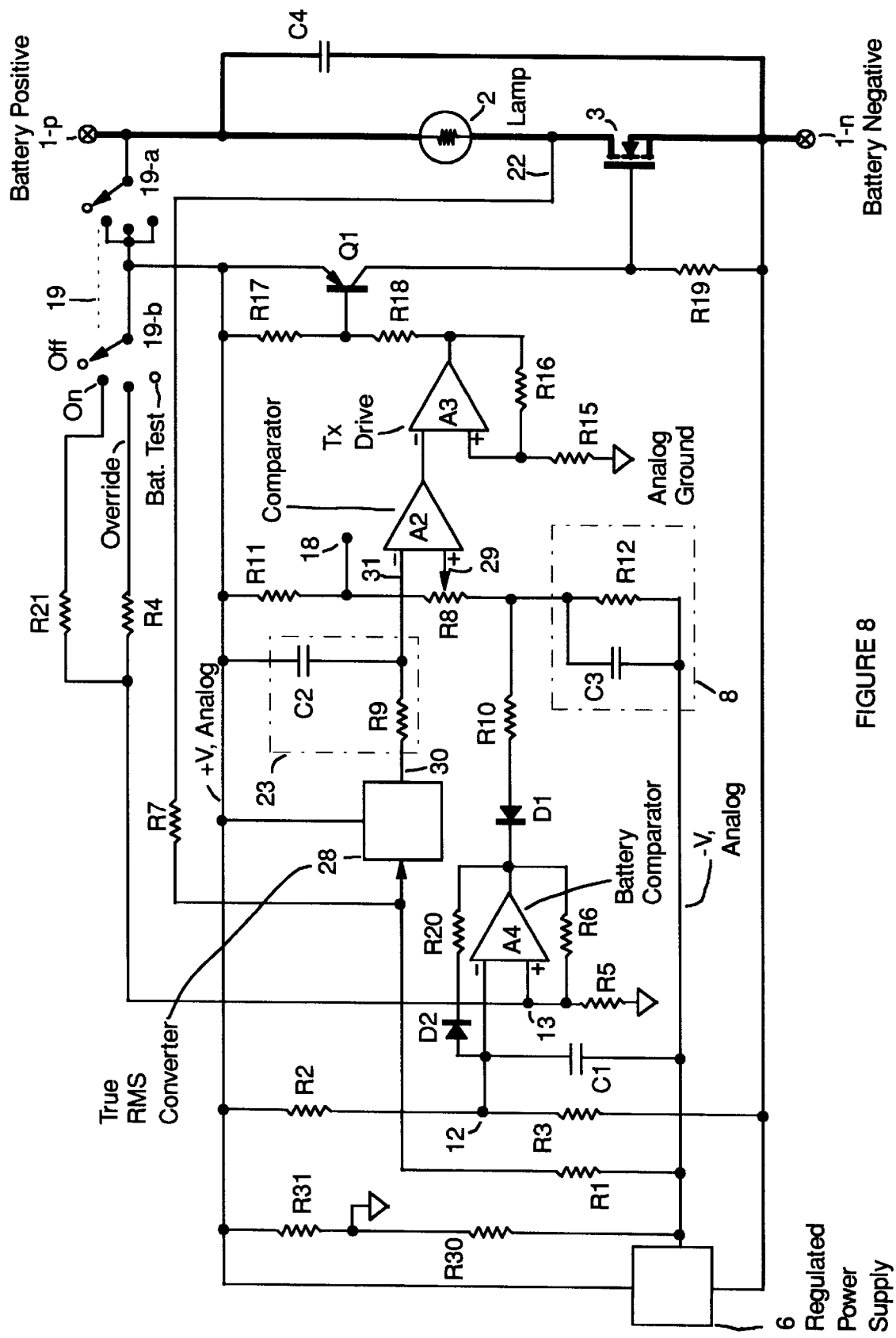
FIG. 8. is the circuit diagram of the second preferred embodiment of the controller invention which utilizes a true-RMS converter.

FIG. 8 shows the circuit implementation of the second preferred embodiment of the present invention which makes use of the true-RMS converter for constant RMS voltage development.

As with the first preferred embodiment for carrying out the present invention, the resistance value of feedback resistor R7 is made sufficiently large that the current flow through R7 is made negligibly small in comparison with the self-discharge rate of the battery 1. Resistors R1 and R7 form a divider for setting the true-RMS converter 28 base line to Analog Ground potential when the current through lamp 2 is shut-off by electronic switch 3 which results in Analog Ground voltage output 30 from the true-RMS converter 28. Any voltage across lamp 2 with respect to battery positive 1-$p$ produces a voltage input with respect to Analog Ground to the true-RMS converter 28 producing the square of the voltage applied to the lamp 2 at the output 30 of the true-RMS converter. Low pass filter 23, formed by the combination of resistor R9 and capacitor C2, averages the output of the square of the voltage waveform applied to the lamp 2 producing a DC voltage level proportional to RMS voltage applied to the lamp 2. The DC voltage level proportional to the RMS voltage applied to the lamp 2 is applied to the negative input 31 of comparator A2 with the positive input 29 supplied by an adjustable resistor divider across the regulated power supply 6. The positive input 29 establishes the controller RMS voltage output set point which comparator A2 matches by adjusting the duty cycle of the battery 1 voltage applied to the lamp 2. Whenever the voltage applied to positive input 29 to comparator A2 exceeds the voltage applied to negative input 31, comparator A2 causes power to be applied to the lamp 2 by switching A3, which in turn switches Q1 and transistor 3 which results in a rising voltage trend applied to the negative input 31 to comparator A2. When the rising voltage trend applied to the negative input 31 to comparator A2 rises above the set point voltage applied to the positive input 29 to comparator A2, comparator A2 switches causing switch 3 to turn-off and shutting-of the current flow to the lamp 2. Shutting-off the current flow to lamp 2 causes the voltage applied to the negative input 31 to fall, and when the negative input 31 falls below the positive input 29, A2 switches again thereby establishing the oscillatory action of the controller.

CONTROLLER ELECTRICAL POWER CONVERSION EFFICIENCY

The power conversion efficiency of the controller circuit is described by the ratio of the power delivered to the incandescent lamp divided by the total power consumed from the battery. The difference between the power delivered to the incandescent lamp and the total power consumed from the battery is the power consumed by the controller function. The power consumed by the controller function is comprised of the power consumed by the analog control circuits, the losses associated with the supply of regulated power, resistance losses associated with transistors Q1 and 3, and the AC effective series resistance losses associated with the C4 battery filter capacitor.

To illustrate the power conversion efficiency of the present invention a representative flashlight design utilizing an 8 cell 12 Volt manganese-alkaline battery for powering a 6V 10 W lamp will be described.

Essentially all of the analog control circuit power loss in the first preferred embodiment which utilizes the linear approximation method for true-RMS development is association with the supply of power to the four operational amplifiers for A1, A2, A3, and A4. An industry standard LM324 operational amplifier meets the controller circuit performance requirements, is inexpensive, and consumes approximately 1 mA at 5V. Four LM324's therefore require 20 mW of power delivery. The power consumption of the analog circuits in the second preferred embodiment, which utilizes the true-RMS converter, is essentially the same as the first preferred embodiment as the power consumption of an AD636 true-RMS converter and the A1 operational amplifier that it replaces are essentially interchangeable.

Using a series linear regulator such as an MC79L05 for the regulated power supply 6, the losses associated with the supply constant voltage becomes the product of the regulated current required multiplied by the difference between the supply voltage, in this case the battery output voltage, and the regulator output voltage. Using 10V for the average battery voltage, 5V for the regulated voltage, and 4 mA for the power consumed by the analog circuits, the loss associated with the supply of regulated power will average 20 mW over the life of the manganese-alkaline battery.

Losses associated with transistor Q1 result primarily from the collector bias resistor R19 which is connected to the battery negative 1-$n$ potential. With a 3K Ohm value for resistor R19 and an average 50% lamp power application duty cycle, the loss associated with transistor Q1 will average 18 mW over the life of the manganese-alkaline battery. Transistor 3 source to drain resistance is in series with the lamp and dissipates power during the conduction portion of the power application cycle. An industry type IRFZ-40 N-MOS transistor 3 with an $R_{ds}$ of 0.04 Ohms would contribute an average loss of 100 mW over the life of the manganese-alkaline battery.

Capacitor C4 stores up battery charge during the off-portion of the transistor 3 conduction cycle and then provides the stored charge to the lamp when transistor 3 conducts. With an average 50% duty cycle for the power application to the lamp, capacitor C3 will then supply 50% of the lamp current during the conduction portion of the cycle. Using a low effective series resistance 2200 $\mu$F capacitor such as a United Chemicon LXF25VB222M with an ESR value of 0.02 Ohms for C4, the AC loss associated with the battery filtering function provided by C4 would contribute an average loss of 50 mW over the life of the manganese-alkaline battery.

Adding up the losses listed above shows that this controller delivers to the lamp 2 approximately 98% of the battery 1 power consumed.

FLASHLIGHT POWER TO LIGHT CONVERSION EFFICIENCY

Figure 1:
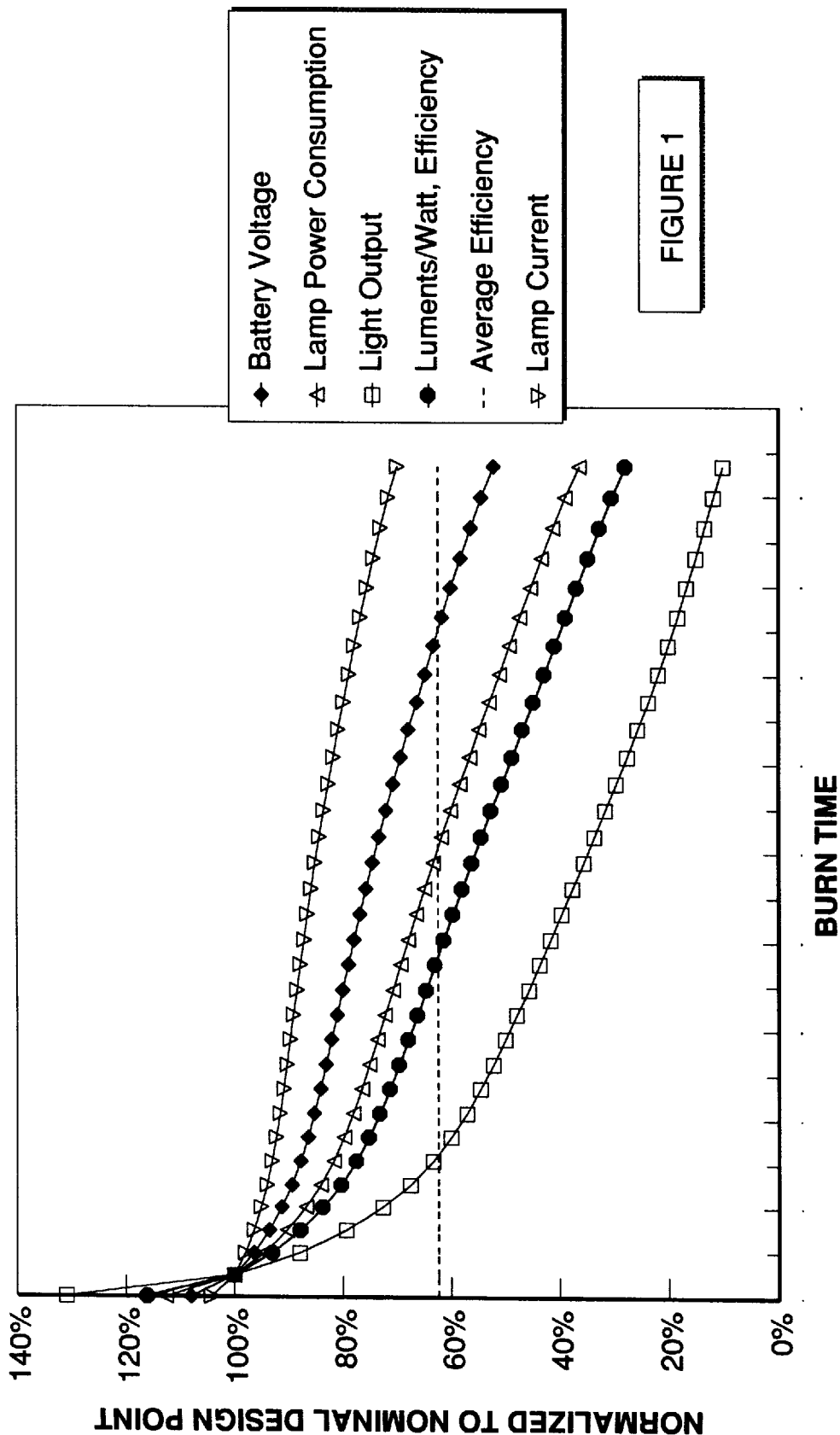
FIG. 1. illustrates the electrical and light output characteristic performance curves of a current design flashlight when powered by manganese-alkaline batteries.
Figure 9:
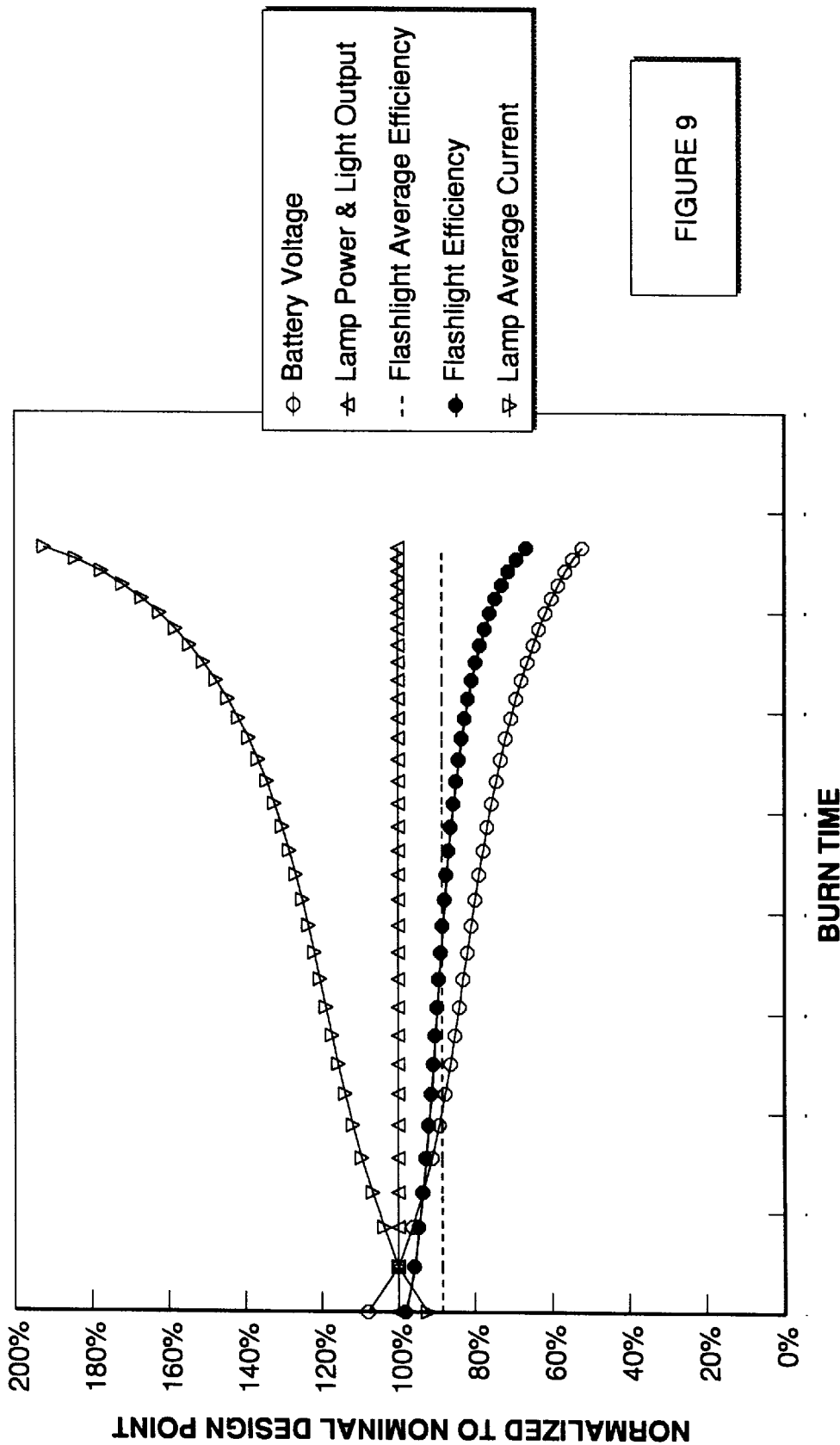
FIG. 9. illustrates the electrical and light output characteristic performance curves of a flashlight design utilizing the present invention when powered by manganese-alkaline batteries.

FIG. 9 shows the electrical and light output performance functions of a flashlight incorporating the present invention which may be compared with FIG. 1 for the conventional directly connected flashlight design. In FIG. 9, the data was developed for a flashlight powered by a 12 Volt 8 cell alkaline battery driving a 6V 10 W lamp with the use of the present invention.

With the present invention depletion of the battery capacity proceeds at a constant rate of power consumption which results in an increasing current consumption trend as the battery output voltage decreases. Comparing FIG. 9 with FIG. 1 we find that, with the present invention the battery voltage output function shape has changed somewhat. During the early part of the battery discharge cycle the battery voltage decrease rate with the present invention is somewhat slower than with the directly connected lamp flashlight design while during the latter part of the battery discharge cycle near the end of battery life, the battery voltage reduction rate with the present design is accelerated in comparison to the directly connected lamp flashlight design. Lamp current consumption with the present invention exhibits a trend which opposite to that exhibited by conventional directly connected lamp flashlight design. With the present invention, current consumption increases slowly with time at first and then at an accelerated rate as the battery voltage output deteriorates. This increase in current consumption during the latter part of the battery discharge cycle with the present invention incurs an added loss resulting from the increasing battery internal resistance as the battery capacity becomes consumed.

The flashlight power to light conversion efficiency function shown in FIG. 9 takes into account the incremental effect of the increased battery internal resistance losses with the present invention in comparison to the conventional directly connected lamp flashlight design. In addition, the power to light conversion efficiency function also accounts for the controller electrical power conversion losses. The average of overall flashlight power to light conversion efficiency of the present invention over the life of the batteries is shown by the horizontal line.

For the flashlight example illustrated in FIG. 9 with the present invention, the average overall flashlight power to light conversion efficiency was determined to be 88% over the life of the battery. By comparison, for the directly connected lamp flashlight design illustrated in FIG. 1, the corresponding average overall flashlight power to light conversion efficiency was determined to be 63% over the life of the battery. Therefore, the relative increase in light output over the life of the battery provided by the present invention for the selected example is then:

$$\text{Light Output Increase} = \frac{88\% - 63\%}{63\%} = 39\% \quad (16)$$

While the invention has been shown and particularly described with reference to preferred embodiments, it will be understood by those skilled in the art that various changes in form and detail may be made therein without departing from the spirit and the scope of the invention.

BIBLIOGRAPHY

[1] *Precision Lamps*, Technical publication of Welch-Allyn, Skaneateles Falls, N.Y., ISL-249-7.5 1993, pp 2
[2] *Van Nostrand's Scientific Encyclopedia*, Sixth Edition, Douglas Consedine Editor, Van Nostrand Reinhold, 1983, pp 377, 1477
[3] *Sylvania Miniature Lighting Products Handbook*, Technical publication of Osram Sylvania, Hillsboro, N.H., Publication #204-R, pp 11
[4] ibid., pp 14
[5] ibid., pp 11
[6] *Subminiature Lamps and Reflectors*, Technical publication of Carley Lamps, Inc., Torrance, Calif., 1990, pp 11
[7] *Carbon Zinc and Cylindrical Alkaline Battery Handbook*, Technical publication of Matsushita Battery Industrial Co., Ltd., Matsushita-cho, Moriguchi, Osaka 570, Japan, Publication BXEC-A092, pp 49

What is claimed:

1. A circuit for maintaining constant RMS voltage across an incandescent lamp when powered from a varying voltage supply with the circuit comprising:
   an incandescent lamp with a nominal voltage rating which is approximately equal to the lowest voltage output of the varying voltage supply;
   a primary high current series circuit comprised of the incandescent lamp, the varying voltage supply, and a switch adapted for switching the current flow from the varying voltage supply to the incandescent lamp;
   a means of sensing the voltage applied to the incandescent lamp adapted to produce a feedback signal of the voltage waveform applied to the incandescent lamp;
   a low pass filter with the feedback signal applied to the low pass filter input and the low pass filter output producing a voltage level proportional to the average of the voltage waveform applied to the incandescent lamp;
   a reference network which produces a scalable output voltage command signal having the characteristic that the scalable output voltage command signal approximates a hyperbolic voltage function of the varying voltage supply;
   a comparison means having two inputs for comparing the voltage output of the low pass filter with the output voltage command signal and the comparison means having an output which controls the switching action of the switch; wherein the switch is turned-on when the output command signal exceeds the output of the low pass filter and is turned-off when the output command signal does not exceed the output of the low pass filter thereby maintaining constant RMS voltage application to the incandescent lamp.

2. The circuit according to claim 1 wherein a means is provided for input of the output voltage command signal from an external source to enable control of the RMS voltage applied to the incandescent lamp with the circuit comprising:
   a voltage summer having multiple inputs with the first input to the summer being the scalable output voltage command signal and the second input to the summer being the voltage applied from the external input with the output of the summer providing the output voltage command signal which is applied to the input of the comparison means.

3. The circuit according to claim 2 wherein gradual RMS voltage application to the incandescent lamp during circuit power-on is provided with the circuit comprising:
   a means for slowing the rise of the output voltage command signal whenever the circuit is powered-up.

4. The circuit according to claim 1 wherein the reference network is a circuit comprised of:
   a first source of reference potential adapted to be coupled to the varying voltage supply providing substantially constant potential when energized;
   a second source of reference potential adapted to be coupled to the varying voltage supply providing substantially constant potential when energized with the potential of the second source being less than the potential of the first source;
   a first resistor voltage divider connected across the first source of reference potential;
   a second resistor voltage divider connected across the common point of the first resistor voltage divider and the negative voltage output of the varying supply voltage, with the output voltage command signal derived from the common point of the second resistor voltage divider and with the output voltage command signal defined with respect to the second source reference potential.

5. The circuit according to claim 4 wherein gradual application of the RMS voltage to the incandescent lamp during circuit power-on is provided with a circuit comprising:
   a capacitor across a resistor in either or both the resistor dividers in claim 4 with the capacitor slowing the rise of the output voltage command signal whenever the circuit is powered-up.

6. The circuit according to claim 1 wherein the RMS voltage applied to the incandescent lamp is modulated whenever the varying voltage supply output falls below a pre-set voltage limit with the circuit comprising:
   a third source of reference potential adapted to be coupled to the varying voltage supply providing the pre-set voltage limit;
   a switching means for the selection of the pre-set voltage limit;
   a means for scaling of the varying voltage supply;
   a comparison means having two inputs for comparing the scaled varying voltage supply with the pre-set voltage limit and the comparison means having an output which modulates the output voltage command signal whenever the voltage of the scaled varying voltage supply drops below the pre-set voltage limit.

7. The circuit according to claim 6 wherein the modulation of the voltage output command signal can be overridden by the user of the circuit with an overriding circuit comprising:
   a switch for the selection of the pre-set voltage limit in claim 6 which is of such potential that under all design conditions that potential inhibits the comparison means.

8. The circuit according to claim 7 wherein whenever the scaled voltage of the varying supply is below the pre-set voltage limit, the modulation of the output voltage command signal is inhibited during circuit power-up for a period of time which is approximately inversely in proportion to the difference between the pre-set voltage limit and the scaled voltage of the varying supply with the circuit comprised of:

a means for slowing the rise of the scaled varying voltage supply applied to the means for comparison in claim 6 whenever the circuit is powered-up.

9. The circuit according to claim 8 wherein the means for slowing the rise of the scaled voltage of the varying supply applied to the means for comparison in claim 6 is a circuit comprised of:

a resistor and capacitor forming a low pass filter with the input to the low pass filter being the varying voltage supply and the output of the low pass filter being applied to the means for comparison in claim 6.

10. The circuit according to claim 7 wherein whenever the scaled voltage of the varying voltage supply is below the pre-set voltage limit, the modulation of the output voltage command signal is inhibited during circuit power-up for a period of time which is inversely in proportion to the difference between the pre-set voltage limit and the scaled voltage of the varying supply with the circuit comprised of:

a means for setting the pre-set voltage limit at circuit power-up to a higher initial potential;

a means for the pre-set voltage limit set to a higher initial potential at power-up to decay with time to the steady state pre-set voltage limit value.

11. The circuit according to claim 10 wherein the means for initially setting the pre-set voltage limit to a higher initial potential at power-up and the means for that higher potential to decay with time to the steady state pre-set voltage limit applied to the means for comparison in claim 6 whenever the circuit is powered-up with the circuit comprised of:

a resistor and capacitor forming a low pass filter with the input to the low pass filter connected to the higher initial potential when the circuit is powered-off and the output of the low pass filter applied to the means for comparison in claim 6.

12. The circuit according to claim 6 wherein the RMS voltage applied to the incandescent lamp is modulated in a repetitive manner whenever the voltage of the varying voltage supply falls below a pre-set voltage limit with the frequency of the repetitive modulation approximately in proportion to the difference between the pre-set voltage limit and the varying voltage supply with a circuit comprising:

a means for producing voltage controlled oscillation as a function of the difference between the pre-set voltage limit and the varying voltage supply with the output of the voltage controlled oscillation applied to the summer in claim 2 and the output of the summer providing the scalable output voltage command signal which is then applied to the input of the comparison means in claim 1.

13. The circuit according to claim 12 wherein the means for producing voltage controlled oscillation as a function of the difference between the pre-set voltage limit and the varying voltage supply is circuit comprised of:

a positive feedback circuit added between the output of comparison means in claim 6 and the positive input of the comparison means providing hysteresis for the means of comparison;

a negative feedback circuit added between the output of the comparison means in claim 6 and the negative input of the comparison means with the negative feedback circuit consisting of a series resistor and diode with the diode polarity such that it becomes forward biased whenever the voltage of the varying supply falls below the pre-set voltage limit;

a capacitor connected to the negative input of the means of comparison in claim 6;

a resistor divider connected across the varying voltage supply with the common point connected to the negative input of the means of comparison in claim 6.

14. The circuit according to claim 1 wherein the current flow from the varying voltage supply becomes sufficiently small to be considered negligible when the varying voltage supply remains connected to the primary high current circuit but the varying voltage supply is removed from the remainder of the circuit with the circuit comprising:

a switch in the primary high current series circuit which has the characteristic that the current necessary for maintaining the switch in a high impedance state is negligible with respect to the varying voltage supply;

a high resistance characteristic in the means for sensing the voltage waveform applied to the incandescent lamp such that the sensing current is made negligible with respect to the varying voltage supply.

15. The circuit according to claim 14 where the switch circuit in the primary high current series circuit is comprised of:

an enhancement mode MOS transistor;

a source to gate biasing of the MOS transistor such that the source to gate potentials are made to be equal when the varying voltage supply remains connected to the primary high current circuit.

16. A circuit for maintaining constant RMS voltage across an incandescent lamp when powered from a varying voltage supply with the circuit comprising:

an incandescent lamp with a nominal voltage rating which is approximately equal to the lowest voltage output of the varying voltage supply;

a primary high current series circuit comprised of the incandescent lamp, the varying voltage supply, and a switch adapted for switching the current flow from the varying voltage supply to the incandescent lamp;

a means of sensing the voltage applied to the incandescent lamp adapted to produce a feedback signal of the voltage waveform applied to the incandescent lamp;

a means for squaring the voltage of the feedback signal waveform applied to the incandescent lamp;

a low pass filter with the squared feedback signal applied to the low pass filter input and the low pass filter output producing a voltage level proportional to the average of the square of the voltage waveform applied to the incandescent lamp;

a scalable source of reference potential adapted to be coupled to the varying supply voltage providing substantially constant output voltage command signal potential when energized;

a comparison means having two inputs for comparing the voltage output of the low pass filter with the output voltage command signal and the comparison means having an output which controls the switching action of the switch; wherein the switch is turned-on when the output command signal exceeds the output of the low pass filter and is turned-off when the output command signal does not exceed the output of the low pass filter thereby maintaining constant RMS voltage application to the incandescent lamp.

17. The circuit according to claim 16 wherein a means is provided for input of the output voltage command signal from an external source to enable the control of the RMS voltage applied to the incandescent lamp with the circuit comprising:

a voltage summer having multiple inputs with the first input to the summer being the scalable output voltage command signal and the second input to the summer being the voltage applied from the external input with the output of the summer providing the output voltage command signal which is applied to the input of the comparison means.

18. The circuit according to claim 16 wherein gradual RMS voltage application to the incandescent lamp during circuit power-on is provided with the circuit comprising:

a means for slowing the rise of the output voltage command signal whenever the circuit is powered-up.

19. The circuit according to claim 18 wherein gradual application of the RMS voltage to the incandescent lamp during circuit power-on is provided with a circuit comprising:

a resistor divider applied across the scalable source of reference potential adapted to be coupled to the varying voltage supply;

a capacitor applied across one resistor of the voltage divider forming a low pass filter such that the voltage rise at the common point of the resistor divider is slowed whenever the circuit is powered-up with the common point of the resistor divider network providing the voltage output command signal input to the comparison means in claim 16.

20. The circuit according to claim 16 wherein the RMS voltage applied to the incandescent lamp is modulated whenever the varying voltage supply output falls below a pre-set voltage limit with a circuit comprising:

a means for selection of a pre-set voltage limit;
a means for scaling of the varying voltage supply;
a comparison means having two inputs for comparing the scaled varying voltage supply with the pre-set voltage limit and the comparison means having an output which modulates the output voltage command signal whenever the voltage of the scaled varying voltage supply drops below the pre-set voltage limit.

21. The circuit according to claim 20 wherein the modulation of the voltage output command signal can be overridden by the user of the circuit with an overriding circuit comprising:

a switch for the selection of the pre-set voltage limit in claim 20 which is of such potential that under all design conditions that potential inhibits the comparison means.

22. The circuit according to claim 21 wherein whenever the scaled voltage of the varying voltage supply is below the pre-set voltage limit, the modulation of the output voltage command signal is inhibited during circuit power-up for a period of time which is approximately inversely in proportion to the difference between the pre-set voltage limit and the scaled voltage of the varying supply with the circuit comprised of:

a means for slowing the rise of the scaled varying voltage supply applied to the means for comparison in claim 20 whenever the circuit is powered-up.

23. The circuit according to claim 22 wherein the means for slowing the rise of the scaled voltage of the varying supply applied to the means for comparison in claim 20 is a circuit comprised of:

a resistor and capacitor forming a low pass filter with the input to the low pass filter being the varying voltage supply and the output of the low pass filter being applied to the means for comparison in claim 20.

24. The circuit according to claim 21 wherein whenever the scaled voltage of the varying supply is below the pre-set voltage limit, the modulation of the output voltage command signal is inhibited during circuit power-up for a period of time which is inversely in proportion to the difference between the pre-set voltage limit and the scaled voltage of the varying supply with the circuit comprised of:

a means for setting the pre-set voltage limit at circuit power-up to a higher initial potential;

a means for the decay with time of the higher initial potential of the pre-set voltage limit to the steady state value of the pre-set voltage limit.

25. The circuit according to claim 24 wherein the means for initially setting the pre-set voltage limit to a higher initial potential and the means for that higher potential to decay with time to the steady state pre-set voltage limit applied to the means for comparison in claim 20 whenever the circuit is powered-up with the circuit comprised of:

a resistor and capacitor forming a low pass filter with the input to the low pass filter connected to the higher initial potential when the circuit is powered-off and the output of the low pass filter raising the steady-state value of the pre-set voltage limit applied to the means for comparison in claim 20.

26. The circuit according to claim 20 wherein the RMS voltage applied to the incandescent lamp is modulated in a repetitive manner whenever the voltage of the varying voltage supply falls below a pre-set voltage limit with the frequency of the repetitive modulation approximately in proportion to the difference between the pre-set voltage limit and the varying voltage supply with a circuit comprising:

a means for producing voltage controlled oscillation as a function of the difference between the pre-set voltage limit and the varying voltage supply with the output of the voltage controlled oscillation applied to the summer in claim 17 and the output of the summer providing the scalable output voltage command signal which is then applied to the input of the comparison means in claim 16.

27. The circuit according to claim 26 wherein the means for producing voltage controlled oscillation as a function of the difference between the pre-set voltage limit and the varying voltage supply is circuit comprised of:

a positive feedback circuit added between the output of the comparison means in claim 20 and the positive input of the comparison means providing hysteresis for the means of comparison;

a negative feedback circuit added between the output of the comparison means in claim 20 and the negative input of the comparison means with the negative feedback circuit consisting of a series resistor and diode with the diode polarity such that it becomes forward biased whenever the voltage of the varying supply falls below the pre-set limit voltage;

a capacitor connected to the negative input of the means of comparison in claim 20;

a resistor divider connected across the varying voltage supply with the common point connected to the negative input of the means of comparison in claim 20.

28. The circuit according to claim 16 wherein the current flow from the varying voltage supply becomes sufficiently small to be considered negligible when the varying voltage supply remains connected to the primary high current circuit but the varying voltage supply is removed from the remainder of the circuit with the circuit comprising:

a switch in the primary high current series circuit which has the characteristic that the current necessary for maintaining the switch in a high impedance state is negligible with respect to the varying voltage supply;

a high resistance characteristic in the means for sensing the voltage waveform applied to the incandescent lamp such that the sensing current is made negligible with respect to the varying voltage supply.

29. The circuit according to claim 28 where the switch circuit in the primary high current series circuit is comprised of:

an enhancement mode MOS transistor;

a source to gate biasing of the MOS transistor such that the source to gate potentials are made to be equal when the varying voltage supply remains connected to the primary high current circuit.

* * * * *